(12) United States Patent
Krishnan

(10) Patent No.: US 10,634,093 B2
(45) Date of Patent: Apr. 28, 2020

(54) MANDREL ASSEMBLY AND METHOD OF MANUFACTURING SOLID ROCKET PROPELLANT GRAIN USING THE SAME

(71) Applicant: CHAIRMAN, DEFENCE RESEARCH & DEVELOPMENT ORGANISATION (DRDO), New Delhi (IN)

(72) Inventor: Anish Bala Krishnan, Telangana (IN)

(73) Assignee: Chairman, Defence Research & Development Organisation, New Delhi (IN)

( * ) Notice: Subject to any disclaimer, the term of this patent is extended or adjusted under 35 U.S.C. 154(b) by 278 days.

(21) Appl. No.: 15/561,149

(22) PCT Filed: Jul. 6, 2015

(86) PCT No.: PCT/IB2015/055086
§ 371 (c)(1),
(2) Date: Sep. 25, 2017

(87) PCT Pub. No.: WO2016/156935
PCT Pub. Date: Oct. 6, 2016

(65) Prior Publication Data
US 2018/0106217 A1    Apr. 19, 2018

(30) Foreign Application Priority Data
Mar. 27, 2015    (IN) .............................. 858/DEL/2015

(51) Int. Cl.
*F02K 9/24* (2006.01)
*B65B 3/02* (2006.01)
(Continued)

(52) U.S. Cl.
CPC ................. *F02K 9/24* (2013.01); *B65B 3/022* (2013.01); *F02K 9/10* (2013.01); *F02K 9/343* (2013.01); *F05D 2230/21* (2013.01)

(58) Field of Classification Search
CPC ...................................... F02K 9/24; F02K 9/10
(Continued)

(56) References Cited

U.S. PATENT DOCUMENTS 3,492,815 A * 2/1970 McCullough ............. F02K 9/24
60/39.47
4,761,254 A    8/1988 Olliff
(Continued)

FOREIGN PATENT DOCUMENTS

EP         1522711 A3 *  6/2005   ............... F02K 9/18

OTHER PUBLICATIONS

International Search Report and Written Opinion dated Jan. 27, 2016 in connection with PCT/IB2015/055086.

*Primary Examiner* — Reginald S Tillman, Jr.
(74) *Attorney, Agent, or Firm* — Wolf, Greenfield & Sacks, P.C.

(57) ABSTRACT

The present disclosure relates to a dismantleable mandrel assembly and a method of molding solid propellant grains with deep fin cavities whose major transverse dimensions are larger than casing opening dimensions in a monolithic rocket motor. The mandrel assembly comprises a base mandrel, a core mandrel insertable into the base mandrel and a plurality of fin molds attachable onto the base mandrel in a circular pattern about the motor axis. The plurality of longitudinal fin cavities is configured with forward swept leading and trailing edges. The manufacturing technique involves assembling and disassembling the mandrel components before propellant casting and after propellant curing respectively in a specific sequence. With minimum number (Continued)

of components and critical joints the method assures reduced quantum of explosive hazard in propellant grain manufacturing for high performance solid rocket motors.

19 Claims, 12 Drawing Sheets

(51) Int. Cl.
*F02K 9/10* (2006.01)
*F02K 9/34* (2006.01)

(58) Field of Classification Search
USPC .................. 102/291, 288, 287; 264/3.4, 3.1
See application file for complete search history.

(56) References Cited

U.S. PATENT DOCUMENTS

| | | | | |
|---|---|---|---|---|
| 5,714,081 A | * | 2/1998 | Tillac | F02K 9/24 |
| | | | | 249/186 |
| 6,101,948 A | * | 8/2000 | Knaresboro | C06B 21/0058 |
| | | | | 102/291 |
| 6,632,378 B1 | * | 10/2003 | Wallace, II | C06B 21/0058 |
| | | | | 102/285 |

* cited by examiner

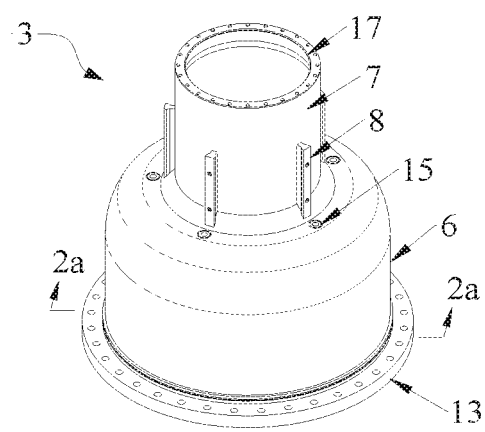
Figure 2
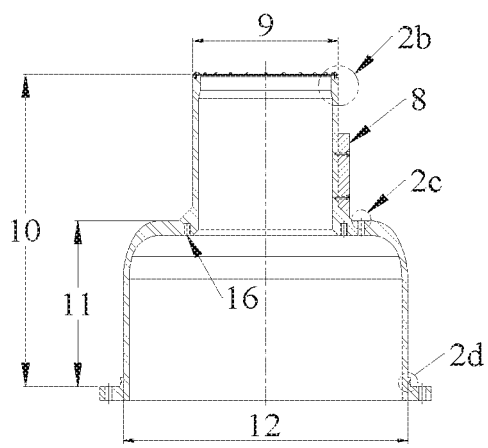
Figure 2a
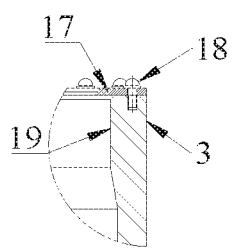 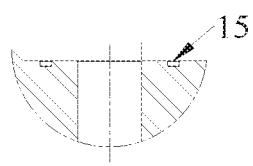 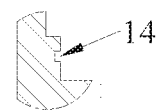
Figure 2b Figure 2c Figure 2d

MANDREL ASSEMBLY AND METHOD OF MANUFACTURING SOLID ROCKET PROPELLANT GRAIN USING THE SAME

CROSS REFERENCE TO RELATED APPLICATIONS

The present application is the National Phase under 35 U.S.C. § 371 of PCT International Application No. PCT/IB2015/055086, filed Jul. 6, 2015, which claims priority to Indian Application No. 858/DEL/2015, filed Mar. 27, 2015, which applications are incorporated herein by reference in their entirety.

FIELD OF THE INVENTION

The present disclosure primarily relates to solid rocket motors, more particularly, to a dismantleable mandrel assembly for manufacturing propellant grain of solid rocket motors.

BACKGROUND

High performance solid rocket motors mandate high 'volumetric loading fractions' in propellant grain and flexibility in 'thrust profile tailoring' apart from increase in propellant energy levels and lighter and stronger structures. Conventional single-piece casting mandrels limit grain design flexibility in large monolithic solid rocket motors because major transverse dimensions of propellant grain cavities molded using single-piece mandrels cannot be larger than the openings in the monolithic casing. Consequently when required it becomes difficult to avoid increase in burn surface area as the grain web burns beyond the rocket motor case opening diameter. Hence single-piece mandrels in typical monolithic casings reduce overall propulsion system design and performance efficiency. Propellant machining is one way of forming grain cavities larger than casing openings. However, the machining process is slow and hazardous. Therefore, casting of propellant slurry inside the motor casing around a dismantleable mandrel and curing it to the final grain shape, before disassembling the mandrel out of the rocket motor (decoring), is both safe and quick.

Conventional mandrel assembly for distributing propellant inside a solid propellant casing as disclosed in EP1522711 A3 (Milleni et al.) comprises a rigid, strip-down plug which is larger transversely than the opening of the casing. The plug is assembled inside the casing after successively inserting the fin molds and a tubular locating body and by releasably locking the fin molds by means of a hydraulic or mechanical device housed partly in the tubular locating body. However, due to the presence of large number of components with critical joints, the chances of propellant slurry leak or ingress into crevices is more. Hence the process of removal of the mandrel assembly (decoring) from the cured propellant grain becomes more hazardous.

Another conventional dismountable mechanical core and procedure for implementing it as disclosed in U.S. Pat. No. 5,714,081 (Tilac et al.) comprises a dismountable mechanical core that includes a counterform attached to a central mandrel. The components of the counterform are attached to the central mandrel by rod anchoring devices. During the disassembling process, the anchor rods are dismantled from the central mandrel, the central mandrel is then withdrawn and each counterform component is separated. With large number of components, the process of removal of the mandrel assembly (decoring) from the cured propellant grain becomes more hazardous. Furthermore, conventional casting techniques involve machining of the cured propellant grain especially the counter-bore to obtain the final shape of the propellant grain. However the machining process is hazardous and involves the risk of explosion.

Therefore, there is a need for a new mandrel assembly that is simple with less number of parts and joints and a technique for using the mandrel assembly that is safer to manufacture propellant grains with deep cavities and overcome the above mentioned difficulties or problems. Consequently, those skilled in the art will appreciate the present disclosure that provides many advantages and overcomes all the above and other limitations.

SUMMARY

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a mandrel assembly for manufacturing a solid propellant grain of a rocket motor. The assembly comprises a base mandrel, a core mandrel and a plurality of fin molds. The base mandrel is removable connectable to aft-end opening of rocket motor casing and capable of forming an aft-end counter bore in the propellant grain of the rocket motor. The core mandrel is removably connectable to the base mandrel and capable of forming a longitudinal axial cavity in the propellant grain. The plurality of fin molds is removably connectable to the base mandrel. The plurality of fin molds comprises a forward-swept leading edge and a forward-swept trailing edge to form a plurality of forward-swept longitudinal hollow fin molds circular patterned around the axial cavity in the solid propellant grain of the rocket motor.

Further, the present disclosure relates to a method of manufacturing a solid propellant grain of a rocket motor using the mandrel assembly by configuring the mandrel assembly inside a casing of the rocket motor. The mandrel assembly is configured into the rocket motor casing by providing a plurality of fin molds followed by a base mandrel into the casing of the rocket motor and manually connecting the plurality of fin molds to the base mandrel. Further, a core mandrel configured to form a longitudinal axial cavity in the propellant grain, is inserted into the base mandrel. Upon assembling the mandrel assembly with proper seals inside the casing, propellant slurry is cast inside the casing through a hopper at its fore-end opening. Upon curing, the mandrel assembly is dismantled and extracted from the rocket motor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The features of the present disclosure will become more fully apparent from the following description and appended claims, taken in conjunction with the accompanying drawings. Understanding that these drawings depict only several embodiments in accordance with the disclosure and are therefore, not to be considered limiting of its scope. The disclosure will be described with additional specificity and detail through use of the accompanying drawings.

FIG. 1 illustrates a cut-view of a rocket motor casing showing all components of mandrel assembly in accordance with an embodiment of the present disclosure;

FIGS. 2 and 2a respectively illustrate an isometric view and sectional view of base mandrel assembly in accordance with an embodiment of the present disclosure;

FIGS. 2b, 2c and 2d illustrate enlarged view of features of the base mandrel assembly as indicated in FIG. 2a in accordance with an embodiment of the present disclosure.

Figure 1:
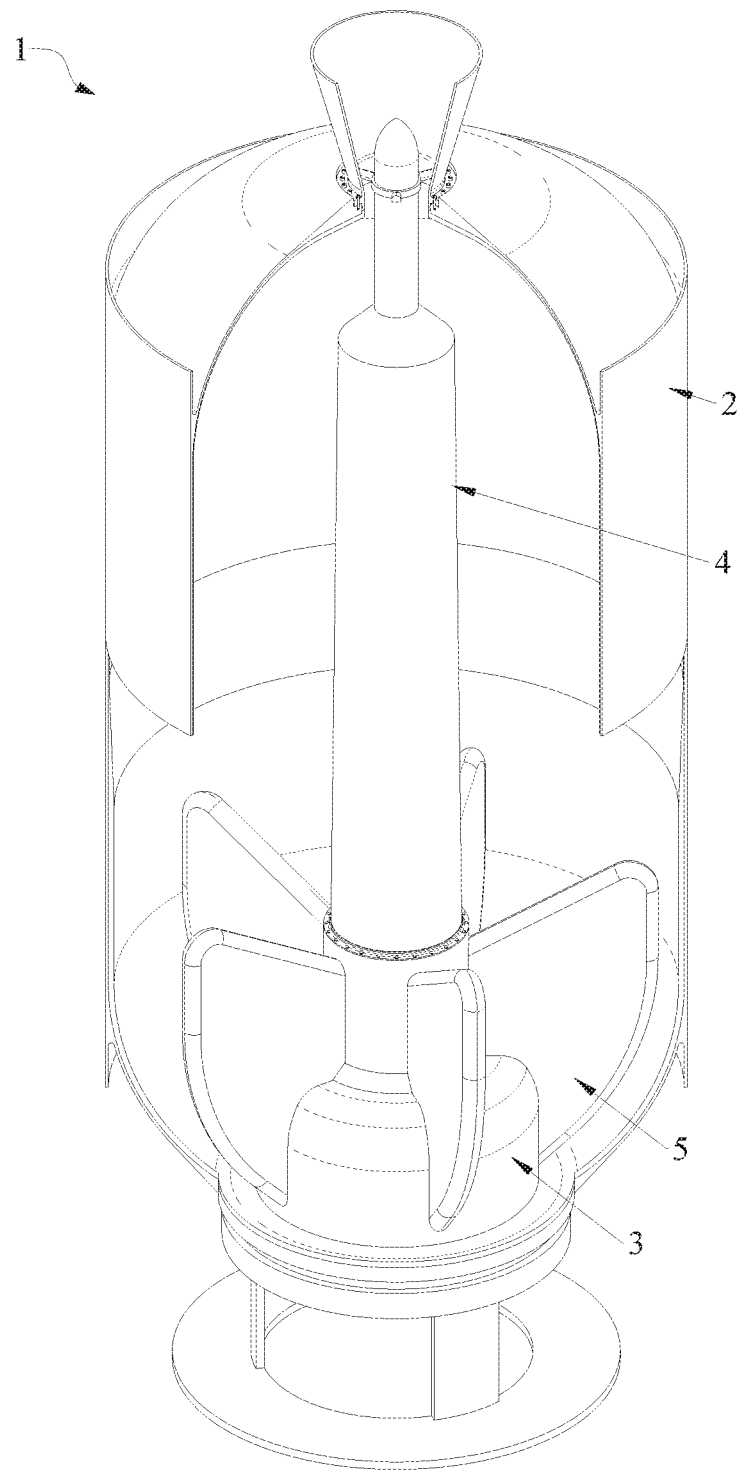
Figure 3:
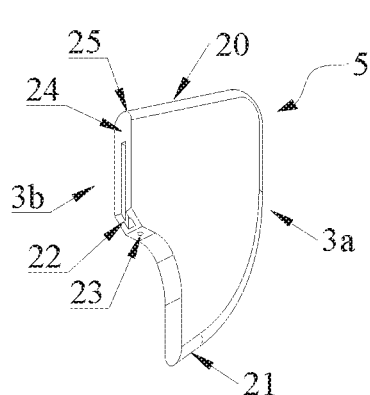
FIG. 3 illustrates perspective view of a fin mold of the mandrel assembly of FIG. 1 in accordance with an embodiment of the present disclosure.
Figure 3A:
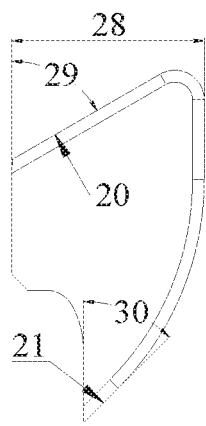
Figure 3B:
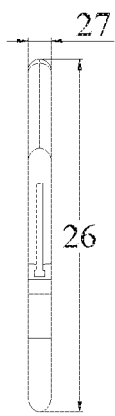
Figures 4, 4A:
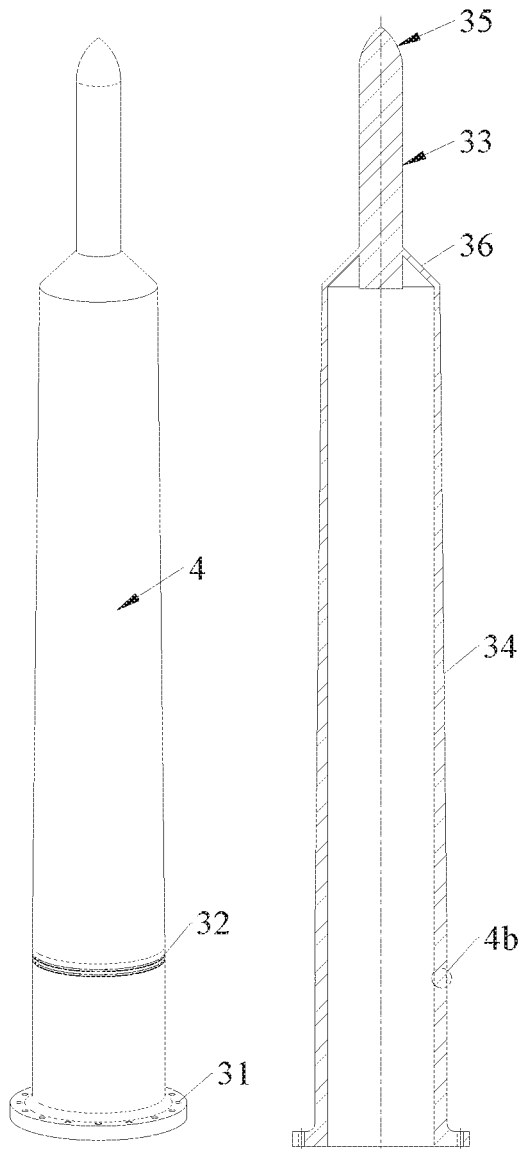
Figure 4B:
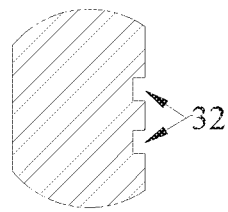
Figure 5A:
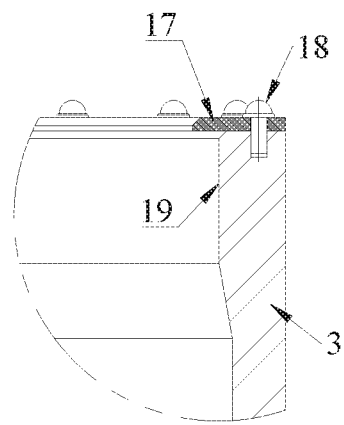
Figure 6A:
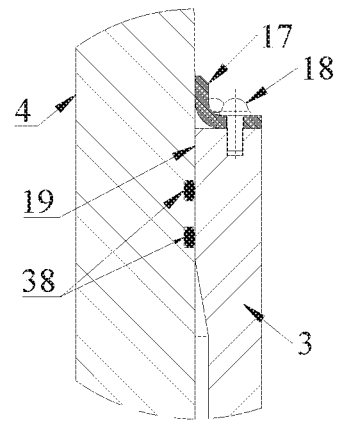
Figure 5:
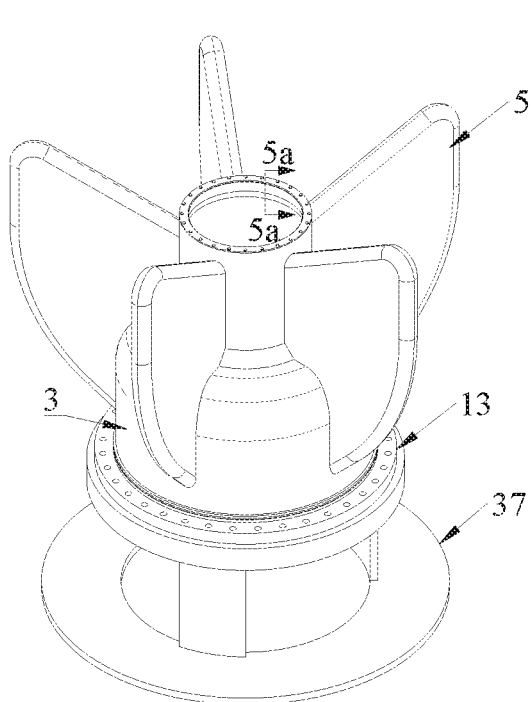
Figure 6:
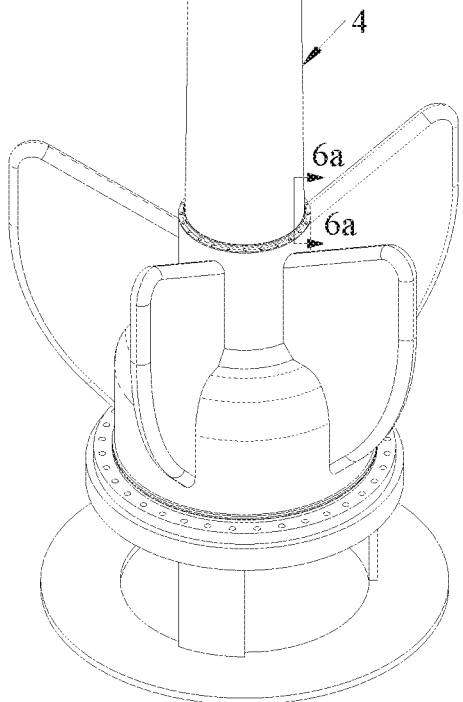
Figure 7:
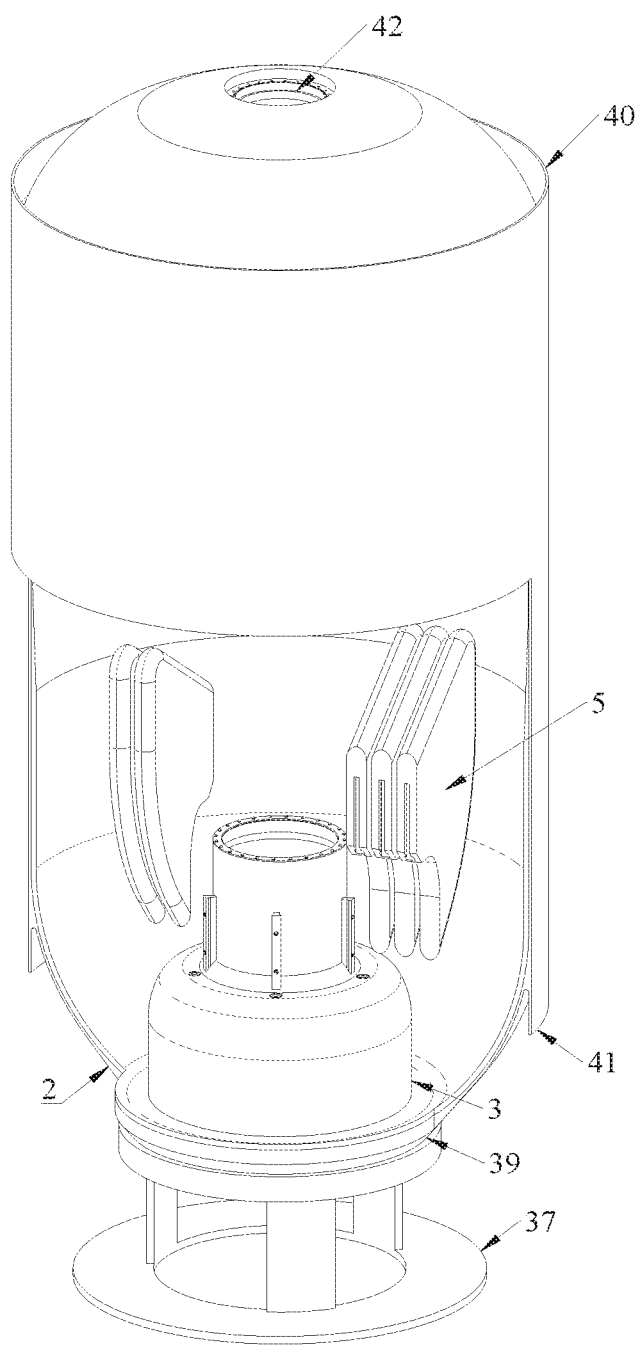
Figure 8:
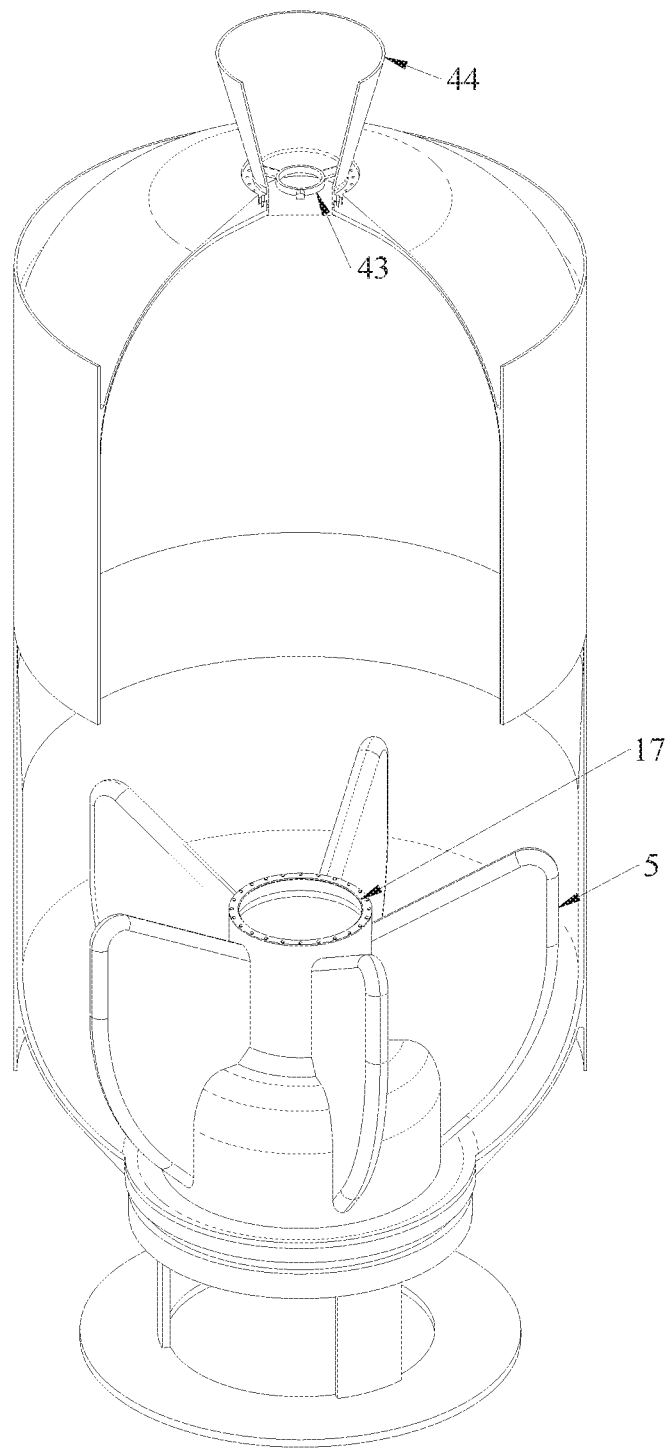
Figures 9, 9A:
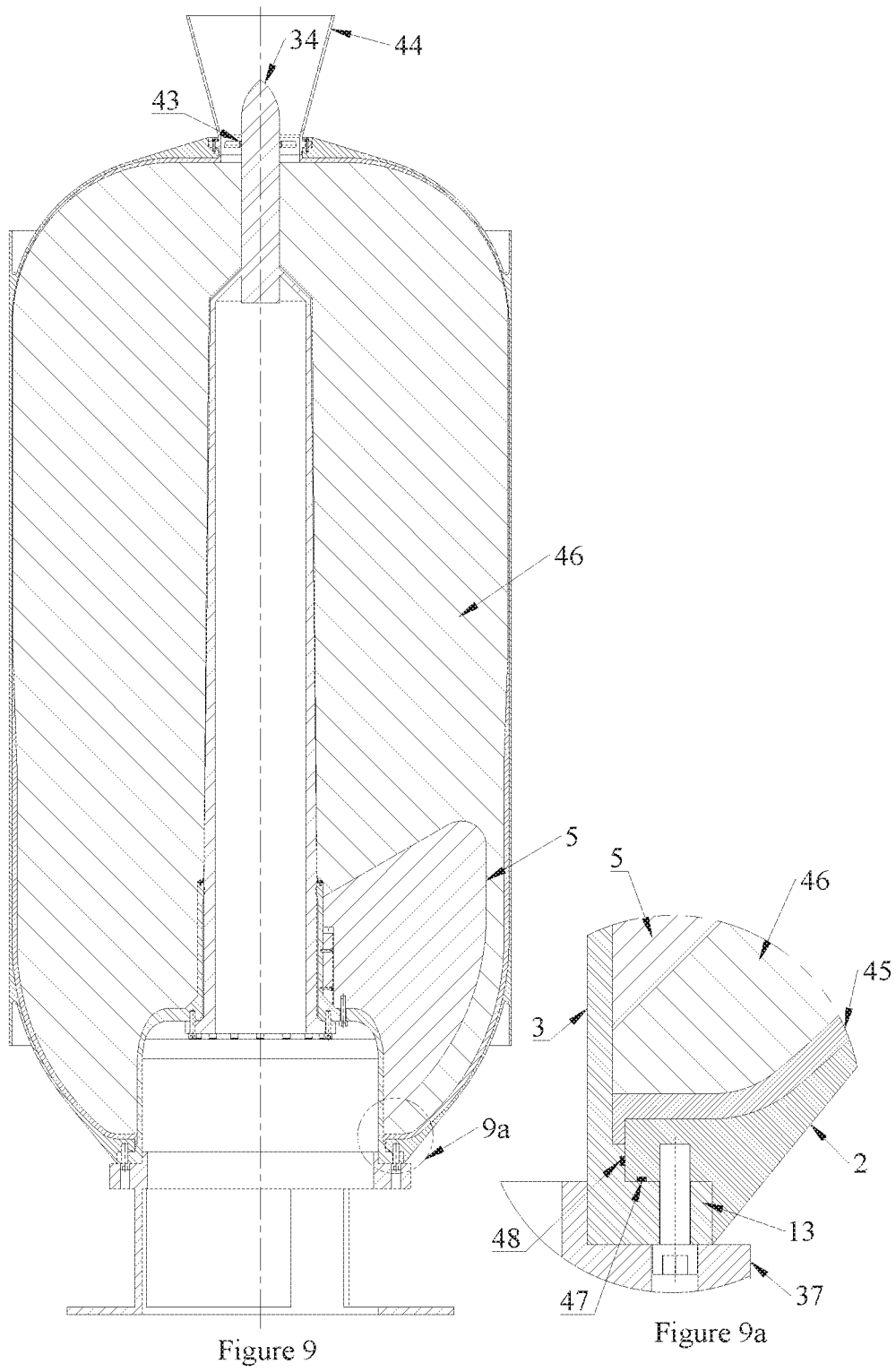
Figure 10:
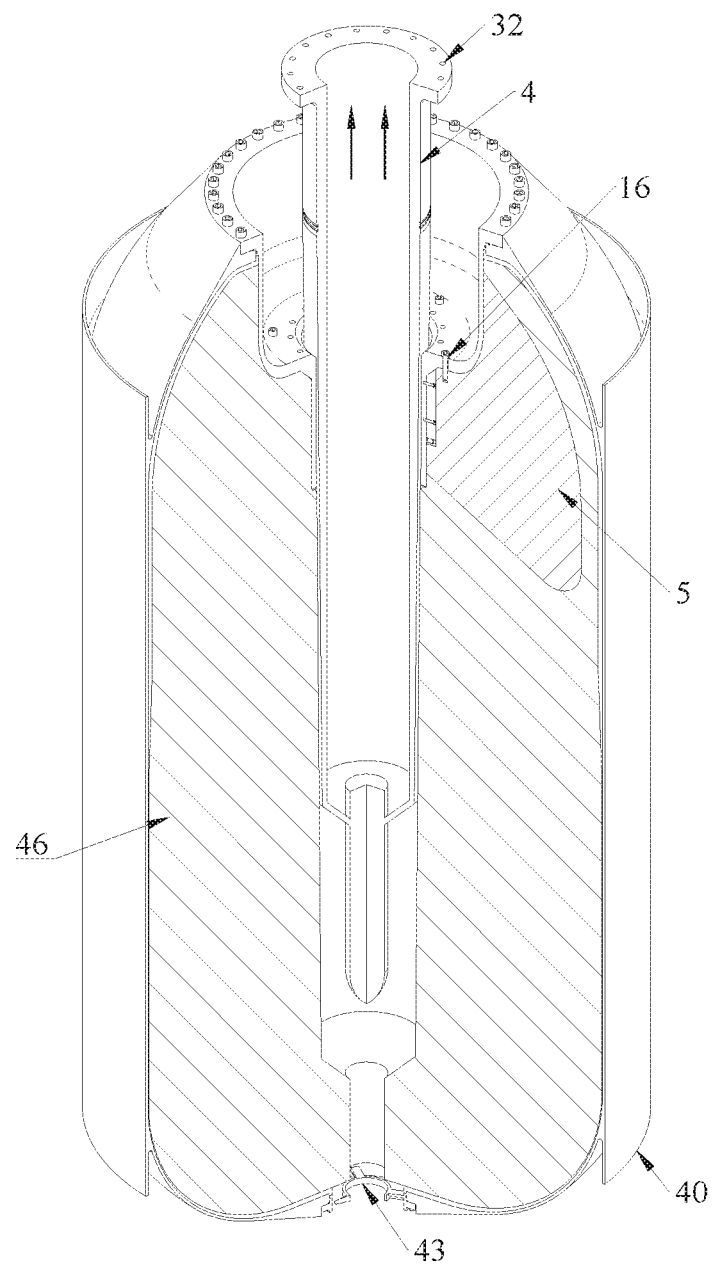
Figure 11:
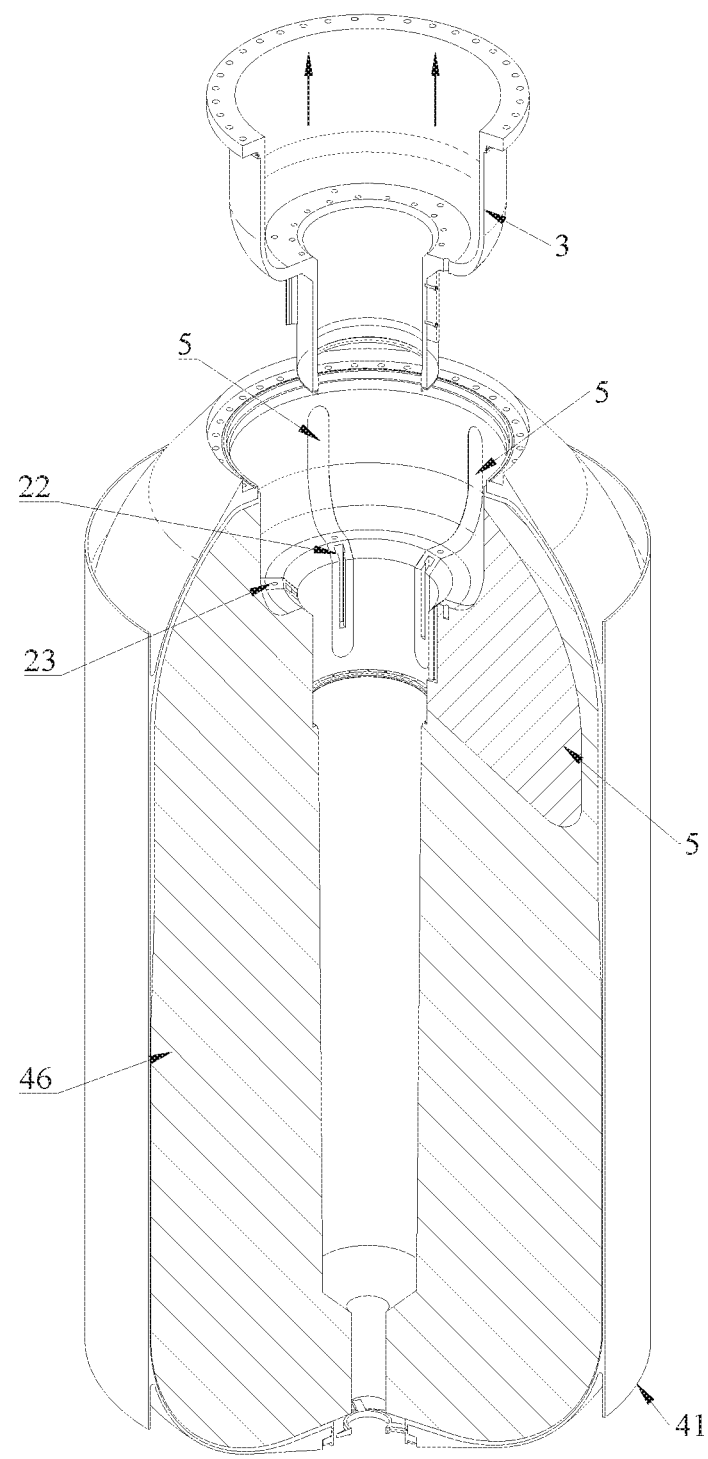
Figure 12:
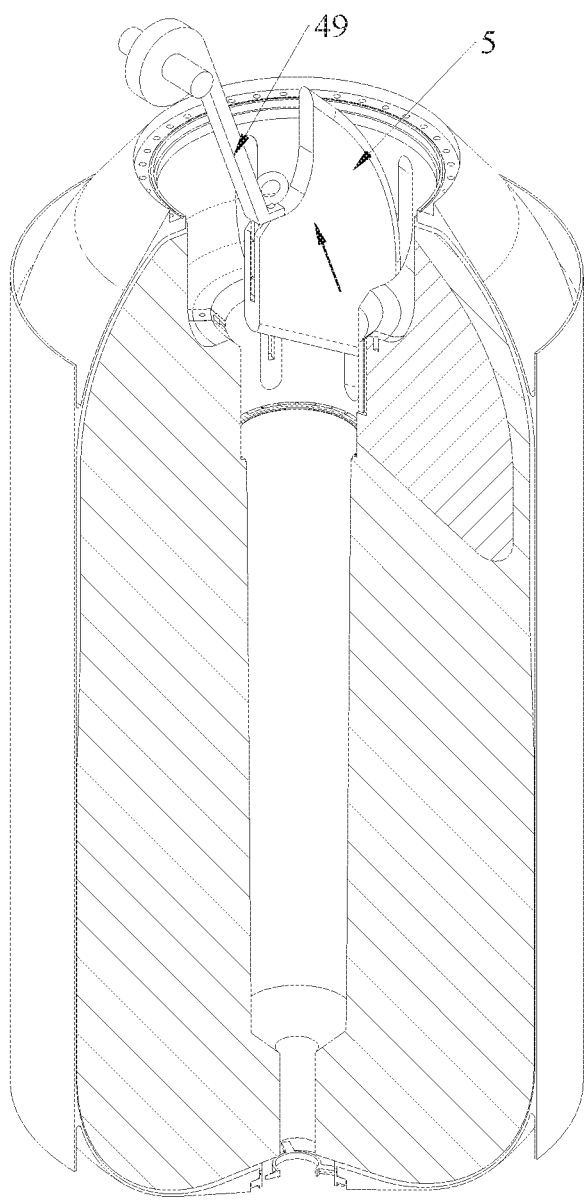
Figure 13:
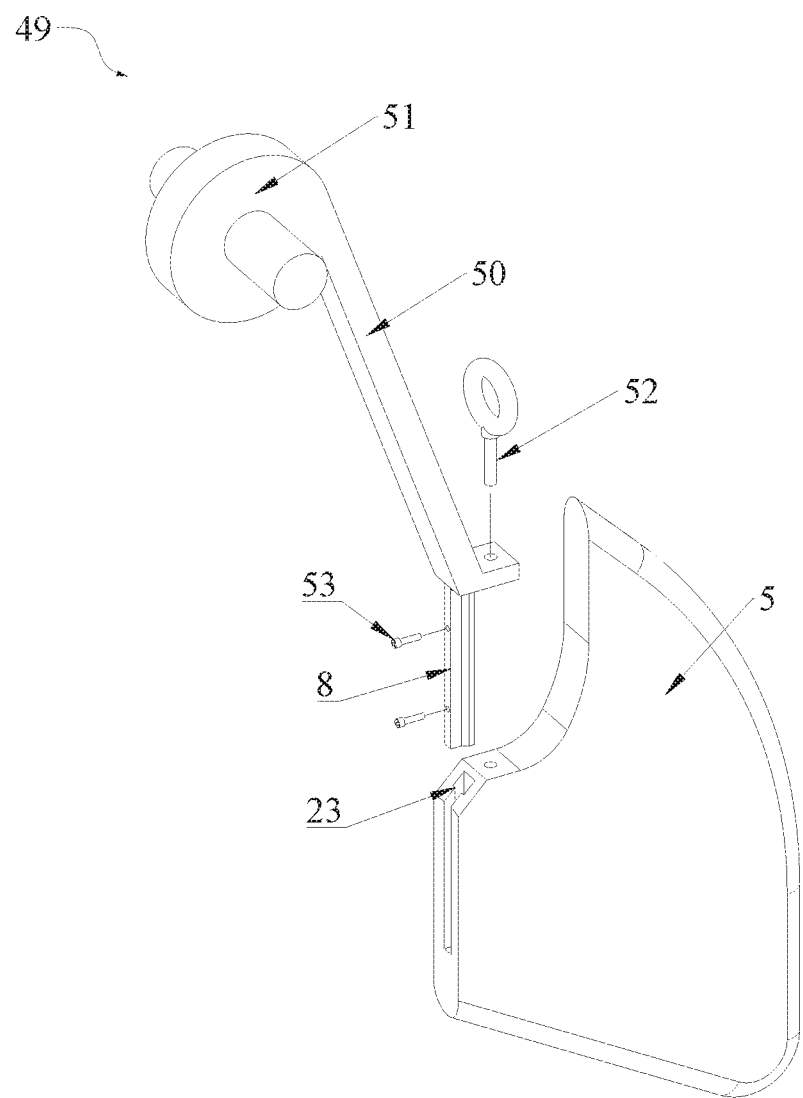
Figure 14:
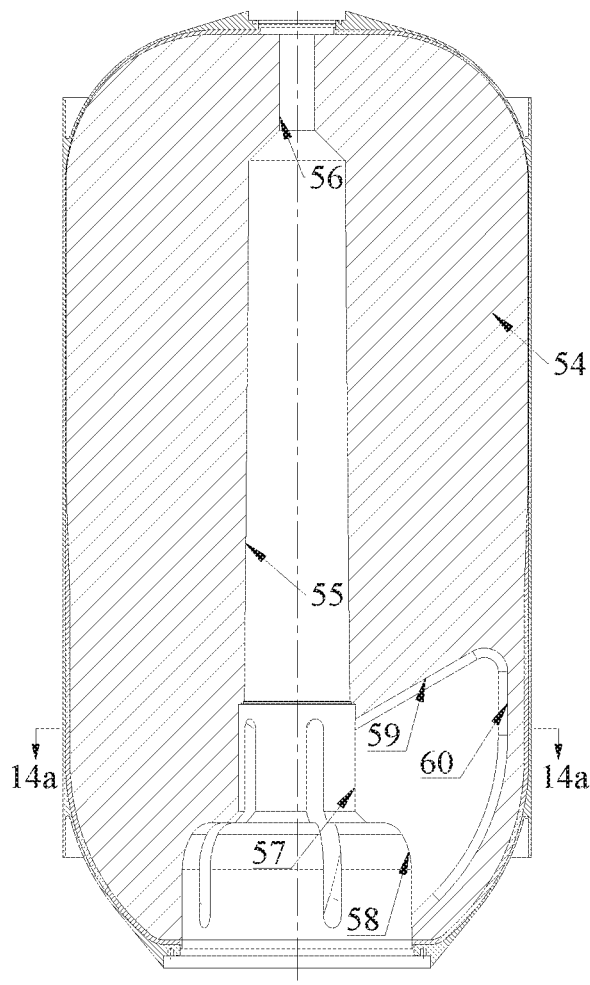
Figure 14A:
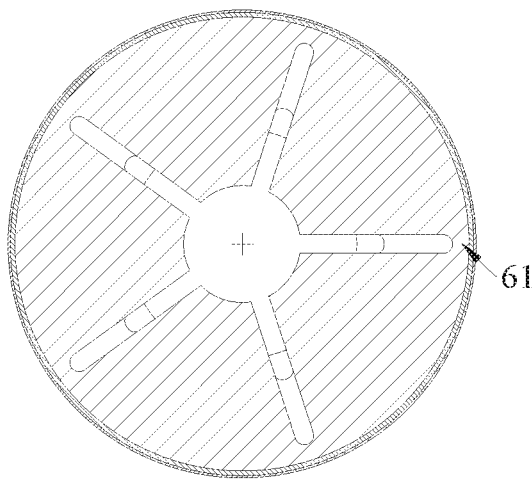

FIGS. 3a and 3b respectively illustrate front view and side view of the fin mold of FIG. 3 in accordance with an embodiment of the present disclosure;

FIGS. 4 and 4a respectively illustrate a perspective view and sectional view of core mandrel of mandrel assembly of FIG. 1 in accordance with an embodiment of the present disclosure;

FIG. 4b illustrates enlarged sectional view of gasket grooves of the core mandrel as indicated in FIG. 4a in accordance with an embodiment of the present disclosure;

FIG. 5 illustrates perspective view of the base mandrel of the mandrel assembly of FIG. 1 with fin molds stacked around in accordance with an embodiment of the present disclosure;

FIG. 5a illustrates detailed sectional view of the undeformed annular seal of the base mandrel as indicated in FIG. 5 in accordance with an embodiment of the present disclosure;

FIG. 6 illustrates the mandrel assembly including the core mandrel in accordance with an embodiment of the present disclosure;

FIG. 6a illustrates the detailed sectional view of deformed annular seal of the base mandrel as indicated in FIG. 6 in accordance with an embodiment of the present disclosure;

FIG. 7 illustrates a cut view of the rocket motor casing with base mandrel assembly seated on an assembly stool showing the fin molds stacked or suspended inside the motor casing in accordance with an embodiment of the present disclosure;

FIG. 8 illustrates a cut view of the rocket motor casing with assembled fin molds and spider-hopper assembly mounted at the fore-end opening of the rocket motor casing in accordance with an embodiment of the present disclosure;

FIG. 9 illustrates sectional view of rocket motor casing with mandrel assembly filled with propellant slurry in accordance with an embodiment of the present disclosure;

FIG. 9a illustrates detailed sectional view of joint sealing between the base mandrel and aft-end opening in the rocket motor casing as indicated in FIG. 9 in accordance with an embodiment of the present disclosure;

FIGS. 10 and 11 illustrate steps of disassembling the mandrel assembly from the rocket motor with cured propellant grain in accordance with an embodiment of the present disclosure;

FIG. 12 illustrates exemplary view of the rocket motor casing during disassembly of fin molds using a fin disassembling tool in accordance with an embodiment of the present disclosure;

FIG. 13 shows the exploded perspective view of the fin disassembling tool in accordance with an embodiment of the present disclosure;

FIG. 14 illustrates an exemplary forward-swept, deep-finocyl propellant grain formed in the rocket motor casing after disassembling the mandrel in accordance with an embodiment of the present disclosure;

FIG. 14a illustrates the sectional view of the motor with deep fins in accordance with an embodiment of the present disclosure;

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the scope of the invention.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limiting sense. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure relates to a mandrel assembly and a method of manufacturing monolithic, case-bonded solid propellant rocket motor grains using the mandrel assembly. The mandrel assembly comprises a base mandrel, a core mandrel insertable into the base mandrel and a plurality of fin molds attachable onto the base mandrel. Each of the mandrel components help in forming desirable cavities inside the cast and cured propellant grain. The mandrel components can be made of metallic or composite material, the latter is lighter to handle. Since the mandrel components are rigidly fastened to the motor casing issues related to buoyancy of mandrels in conventional casting techniques do not apply here. The base mandrel forms a counter-bore at the aft-end of the rocket motor. The core mandrel forms an axial longitudinal cavity through the grain. The plurality of fin molds forms longitudinal cavities with forward-swept leading and trailing edges circular-patterned about the axial cavity. The mandrel assembly is assembled inside the casing of the rocket motor by first taking the fin molds inside, then attaching the base mandrel to aft-end opening of the casing, attaching the plurality of fin molds onto the base mandrel and finally inserting the core mandrel into the base mandrel. During the casting process, propellant slurry is poured into the casing through a hopper in its fore-end opening. Upon completion of casting and curing of the propellant grain, the mandrel assembly is safely removed from the motor in a specific sequence. Due to minimum number of components, joints and seals in the disclosed mandrel assembly, the decoring of mandrel assembly assures minimum friction and thereby minimizes explosion hazard. The technique of casting of the propellant grain using the disclosed mandrel assembly also avoids or minimizes any machining requirements that are otherwise required post-curing and decoring.

FIG. 1 illustrates a solid rocket motor casing with mandrel assembly (1) comprising a rocket motor casing (hereinafter referred to as "casing") (2) having a fore-end and an aft-end openings. The casing (2) is an internally insulated casing using any insulating material known in the art. The mandrel assembly is assembled inside the casing (2) before casting the propellant grain in the rocket motor. All exposed surfaces of the mandrel assembly are coated with Teflon or similar non-adhesive material to prevent propellant sticking to the mandrel.

In one embodiment, the mandrel assembly comprises at least a base mandrel (3), a core mandrel (4) and a plurality of fin molds (5) attached to the base mandrel (3). The base mandrel (3) is configured to form a counter bore in the propellant grain of the rocket motor. As illustrated in FIG. 2, the base mandrel (3) is a hollow axisymmetric structure comprising a counter-bore portion (6) beneath a port portion (7). The port portion (7) is configured with a plurality of guides (8) disposed in a circular pattern on the outer circumference of the base mandrel (3) for radially anchoring the plurality of fin molds (5) onto the base mandrel (3). In one embodiment, the plurality of guides (8) is a dove-tailed linear motion (LM) guides.

The external surfaces of the base mandrel (3) are configured so as to form the required profile of the aft-end counter-bore in the propellant grain. As illustrated in FIG. 2a, the base mandrel (3) is configured with one or more dimensions (9, 10, 11, and 12). The dimension (12) of the base mandrel (3) corresponds to the diameter of the aft-end opening of the casing (2). In one embodiment, the dimension (12) may be around 50% to 60% of the outer diameter of the casing (2). Dimension (9) may be slightly larger than the diameter of the propellant grain central port. Based on the dimensions of the casing (2) and the propellant grain central port, the dimension (9) of the base mandrel (3) will allow entry of a mandrel assembly fitter's hand or the fitter himself through the hollow interior of the base mandrel (3). Further, the dimension (11) of the base mandrel (3) corresponds to the depth of the propellant grain counter-bore. Furthermore, the dimension (10) i.e., the total height of the base mandrel (3) corresponds to the approximate root length of the plurality of fin molds (5).

As shown in FIG. 2, the aft-end of the base mandrel (3) is configured with a base mandrel flange (13) for attaching the base mandrel (3) to the aft-end opening of the casing (2). The base mandrel flange (13) includes gasket-grooves (14) (as shown in FIG. 2d) for hermitical sealing of the base mandrel with the aft-end opening of casing. Further, the planar surface of the counter-bore portion (6) of the base mandrel (3) is provided with gasket-grooves (15) around through-holes circular-patterned about the mandrel axis (as illustrated in FIGS. 2, 2a and 2c) beneath the plurality of guides (8) for hermitically sealing the joint and fastening the plurality of fin molds (5) onto the base mandrel (3). Further, the internal surface of the counter-bore portion (6) is configured with number of tapped blind holes (16) for fastening the core mandrel (4) with the base mandrel (3).

The fore-end of the base mandrel (3) is provided with an annular seal (17) on its rim for sealing between the base mandrel (3) and the core mandrel (4). The annular seal (17) is provided for eliminating crevices being formed in the mandrel assembly and for preventing potential propellant slurry ingress into the mandrel assembly interfaces. As illustrated in FIG. 2b, the annular seal (17) bends and conforms to outer surface of the core mandrel (4) for providing a sealing between the core mandrel (4) and the base mandrel (3) when the core mandrel (4) is inserted into the base mandrel (3). In one example, the annular seal (17) is fastened to the base mandrel (3) with number of round-headed screws (18). Further, the cylindrical portion of the base mandrel (3) is provided with a polished internal mating surface (19) with an entry chamfer for hermitical sealing between the base mandrel (3) and the core mandrel (4) as the core mandrel (4) is provided with shaft seals on the mating outer surface of the core mandrel (4).

FIG. 3 illustrates perspective view of a fin mold of the mandrel assembly of FIG. 1 in accordance with an embodiment of the present disclosure.

The mandrel assembly comprises the plurality of fin molds (5) attached to the base mandrel (3). The plurality of fin molds (5) is removably connectable to the base mandrel (3) in a circular pattern about the mandrel axis and comprises a forward-swept leading edge (20) and a forward-swept trailing edge (21) to form a plurality of forward-swept longitudinal hollow fins in the solid propellant grain of the rocket motor (1). The plurality of fin molds (5) is fastened onto the base mandrel (3) through one or more fasteners that are accessible from within the base mandrel (3). The plurality of fin molds (5) comprises a plurality of slots (22) that engages with the plurality of guides (8) of the base mandrel (3) for radially anchoring the plurality of fin molds (5) onto the base mandrel (3). In one example, the plurality of slots (22) may be a linear motion slots. The plurality of fin molds (5) further comprises one or more tapped holes (23) on the planar surface beneath the plurality of slots (22) for longitudinally bolting and hermitically sealing (15) the joint between the base mandrel (3) and the plurality of fin molds (5). In one example, the number of tapped holes (23) may be equal to or multiple of number of the guides (8).

The plurality of fin molds (5) is also configured with a contoured inner surface (24) which conforms to the mating outer contours of the base mandrel (3). The plurality of fin molds (5) and the base mandrel (3) have planar surfaces in the transverse plane for hermitical sealing between them with gaskets. The plurality of fin molds (5) is further configured with contoured outer edges (25) having the required dimension like thickness. In one embodiment, the dimensions of the plurality of fin molds (5) include length (26), thickness (27) and breadth (28) as illustrated in FIGS. 3a & 3b. The angular dimension made by the leading edge (20) and the trailing edge (21) of the plurality of fin molds (5) with the motor axis may be acute. Further, in another embodiment, the angular dimension (29) between the motor axis and leading edge (20) is greater than the angular dimension (30) between the motor axis and the trailing edge (21). This will enable interference-free extraction during decoring. The length (26), thickness (27) and breadth (28) of the plurality of fin molds (5) circular patterned about the base mandrel (3) axis may vary along the longitudinal and radial directions.

FIGS. 4 and 4a respectively illustrate a perspective view and sectional view of core mandrel of mandrel assembly of FIG. 1 in accordance with an embodiment of the present disclosure.

In one embodiment, the core mandrel (4) of the mandrel assembly is generally a hollow cylinder with varying outer diameters and tapers. The core mandrel (4) is removably connectable to the base mandrel (3) at its aft-end and configured to form a longitudinal axial cavity in the propellant grain of the rocket motor (1). As illustrated in FIG. 4, the core mandrel (4) comprises a core mandrel flange (31) at its aft-end for a bolted joint (16) with the base mandrel (3). The core mandrel (4) further comprises gasket grooves (32) on which shaft seals are disposed so as to provide hermitical sealing between the core mandrel (4) and the base mandrel (3) when assembled. In one example, the gaskets may be O-rings. A detailed sectional view of gasket grooves (32) of the core mandrel (4) is illustrated in FIG. 4b.

As illustrated in FIG. 4a, the core mandrel (4) is a hollow longitudinal axisymmetric structure configured with a slender fore-end head (33) and a stout body (34). The slender fore-end head is outwardly cylindrical or tapered in shape and it begins (35) and ends (36) with conical or ogive sections to enable smooth flow of the propellant slurry without any local accumulation during the casting process. The slender fore-end head (33) of the core mandrel when assembled in the motor casing will be located within the fore-end opening of the casing (2). The lesser diameter of the fore-end head (33) will provide required annular gap between the mandrel assembly and fore-end opening in the casing (2) for enabling required propellant slurry charging rate. The stout body (34) of the core mandrel (4) is a tapered cylinder configured to form the longitudinal axial cavity of the cured propellant grain with the taper assisting in easy decoring.

As illustrated in FIGS. 5 & 6, the mandrel assembly is trial assembled outside the casing (2) on top of a skeletal stool (37). The base mandrel (3) is fastened with the skeletal stool (37) using the base mandrel flange (13). The hollow interior area of the base mandrel (3) is accessed through the sides of the skeletal stool (37). Upon fastening the base mandrel (3), the plurality of fin molds (5) are assembled, as illustrated in FIG. 7, around the base mandrel (3) using the plurality of guides (8) and gasketted threaded holes (15) to ensure good fitment between the assembled fin molds (5) and the base mandrel (3).

The annular seal (17) is then attached on the fore-end or rim of the base mandrel (3) using fasteners (18) as illustrated in FIG. 5a. Upon insertion of the core mandrel (4) into the base mandrel (3), the inner part of the annular seal (17) is bent upward conforming to the outer surface of the mating core mandrel (4) and provides sealing between the core mandrel (4) and the base mandrel (3) as shown in FIG. 6a. Further, the shaft seal gaskets (38) provided on the core mandrel (4) presses against the internal surface (19) of the base mandrel (3) to provide the secondary hermitical sealing. The mandrel assembly assembled with the core mandrel (4) and the base mandrel (3) is illustrated in FIG. 6.

The sequence of assembly of the mandrel components inside the motor casing is illustrated in FIGS. 7, 8 and 1. The casing (2) is safely handled using fore-end and aft-end bulk heads (40, 41) with appropriate tools. As illustrated in FIG. 7, first the plurality of fin molds (5) are taken inside the casing (2) through its bigger aft-end opening (39). The plurality of fin molds (5) are either stacked inside the casing (2) or suspended from the fore-end opening (42) of the casing (2). The base mandrel (3) is mounted on the top of the skeletal stool (37) before the casing with fin molds is lowered onto the base mandrel. The joint between base mandrel flange (13) and motor casing is hermitically sealed with gaskets. The plurality of fin molds (5) is then assembled onto the base mandrel (3) either robotically or manually. In one embodiment, a fitter then enters the casing (2) through beneath the base mandrel (3) for assembling the plurality of fin molds (5) onto the base mandrel (3). One by one all the fin molds (5) are guided onto the LM guides on the base mandrel and bolted from below at the gasketted threaded holes (15) with minimal gaps at the interfaces. A spider (43) and a hopper (44) are then assembled over the fore-end opening (40) of the casing (2) as shown in FIG. 8. Upon connecting the plurality of fin molds (5) to the base mandrel (3), filleting of all included-sharp-corner interfaces between base mandrel (3) and fin molds (5) is done with suitable inert material.

The entire assembly is now lifted up and lowered over the vertically mounted core mandrel (4) as illustrated in FIG. 1. Once the core mandrel (4) is fully inside the casing (2), the annular seal (17) and the gaskets (38) provide crevice-free joint and hermitical sealing respectively between the core mandrel (4) and the base mandrel (3). The core mandrel (4) at its fore-end (33) is supported by and located using the spider (43). At its aft-end flange (31) the core mandrel (4) is fastened to the base mandrel (3) with the tapped blind holes (16) of the base mandrel (3). FIG. 9a shows the interface between the base mandrel and the aft-end opening of the casing. Pair of gaskets (47, 48) is used for hermitically sealing the joint. The assembly stool (37) is used for mounting the base mandrel (3) and the internally insulated casing (2). However the base mandrel (3) is only selectively bolted to the skeletal stool—only a few equispaced elongated bolts among the circular patterned bolts in the 'base mandrel—casing' joint are used for fastening to the stool.

After the mandrel assembly is completely assembled within the casing (2), and a successful leak check done with appropriate closures on the fore-end opening of the casing, the propellant slurry (46) is poured into the casing (2) through the hopper (45) located at the fore-end opening (41) of the casing (2). The spider (43) provides an annular gap between the hopper (44) and the mandrel assembly for regulating the rate of flow of the propellant slurry (46) inside the casing (2). After the propellant slurry (46) is filled, the entire arrangement of the casing (2) is cured under predetermined temperature and pressure conditions for a predetermined time period to obtain the sufficiently strengthened propellant grain.

The orientation of the rocket motor (1) for disassembly process is illustrated in FIG. 10. The inverted rocket motor (1) is rested on its fore-end bulkhead (40) and secured radially. Generally as the propellant cures, it shrinks away from the mandrels enabling interference free decoring. First the core mandrel (4) is unfastened from the base mandrel (3) and extracted in vertically upward direction as shown in FIG. 10. The base mandrel (3) is then unfastened from all the fin molds and removed vertically up as shown in FIG. 11. It is followed by removal of the plurality of fin molds (5) one at a time as illustrated in FIG. 12. The plurality of fin molds (5) is removed using a fin decoring tool (49).

In one exemplary embodiment, the fin decoring tool (49) as shown in FIG. 12 is a mass balancing tool that ensures that the center of gravity of the assembly of the fin mold (5) and the fin decoring tool (49) lies directly below the lifting point. The fin decoring tool (49), as illustrated in FIG. 13, comprises a long arm (50) that is configured to provide the counter-mass (51) that stays outside the propellant grain counter-bore (FIG. 12) at all times during the removal of the plurality of fin molds (5). The fin decoring tool (49) is fastened to the fin molds (5) using an eye-bolt (52) for lifting the plurality of fin molds (5) out of the propellant grain. The fin decoring tool (49) may further comprise a pair of additional fasteners like bolts (53) disposed along the guides (8) for providing additional safety against unintended detachment during the disassembling process. Using the fin decoring tool (49), the fins molds (5) are extracted in axial and radial directions simultaneously.

The rocket motor with forward-swept, deep-finocyl propellant grain formed inside the casing after decoring is illustrated in FIG. 14. The propellant grain is a case-bonded propellant grain comprising a longitudinal axial cavity or a central port running along the axis of the rocket motor (1). The propellant grain also comprises a plurality of fins formed around the base of the central port near the aft-end and further comprises a counter-bore (58) at the aft-end to accommodate a submerged nozzle (not shown) of the rocket motor (1). As shown in FIG. 14, the longitudinal axial cavity (55) has a reduced diameter (56) at the fore-end for accommodating igniter (not shown) and an increased diameter (57) at the aft-end side to ensure less-restricted flow of hot combustion gases towards the nozzle (not shown) at the aft-end. In another embodiment, the central port with reduced diameter (56) can be enlarged by locally machining the propellant grain. The molded propellant grain also comprises the plurality of discrete fins (59) with forward-swept leading edge (60) and radially deep cavities whose peripheral edges run parallel to the inner profile of the casing (2). As shown in FIG. 14*a*, the plurality of fins (59) has minimum web thickness (61). In one embodiment, the radial depth of the plurality of the fin cavities is greater than the radius of the aft-end opening (39) of the casing (2).

Advantages of the Present Invention

In one embodiment, the present disclosure relates to a mandrel assembly for manufacturing case-bonded, forward-swept, deep-finocyl propellant grains in monolithic solid rocket motors. The dismantleable mandrel assembly has minimum number of components.

The mandrel components can be made of light weight metals or composite materials without worrying about buoyancy related issues because they are rigidly fastened to the motor casing.

With less number of joints and critical seals and with provision for manual application and inspection of interface fillets, the chances of propellant slurry ingress into crevices and hence the quantum of explosive hazard during decoring are minimized.

As charging of the propellant slurry is done from the fore-end opening of the motor, and the aft-end counter-bore is fully formed by the base mandrel, minimal or no propellant machining is required post-curing and decoring.

REFERENCE NUMERALS USED IN THE PRESENT INVENTION

1—Rocket motor casing with mandrel assembly
2—Casing
3—Base mandrel
4—Core mandrel
5—Fin molds
6—Counter-bore portion of base mandrel
7—Port portion of base mandrel
8—Guides
9—Dimension of base mandrel
10—Dimension of base mandrel
11—Dimension of base mandrel
12—Dimension of base mandrel
13—Base mandrel flange
14—Gasketted flange
15—Gasketted through holes
16—Tapped blind holes
17—Annular seal
18—Fasteners on annular seal
19—Internal mating surface of base mandrel
20—Forward-swept leading edge
21—Forward-swept trailing edge
22—Slots
23—Tapped hole
24—Contoured inner mating surface of fins
25—Outer edges of fins
26—Length of fin
27—Thickness of fin
28—Breadth of fin
29—Angular dimension between motor axis and fin leading edge
30—Angular dimension between motor axis and fin trailing edge
31—Core mandrel flange
32—Gasket grooves
33—Slender head of core mandrel
34—Body of core mandrel
35—Conical or ogive sections of core mandrel
36—Conical or ogive sections of core mandrel
37—Skeletal stool
38—Gaskets
39—Aft-end opening of the casing
40—Fore-end Bulk heads
41—Aft-end Bulk heads
42—Fore-end opening of the casing
43—Spider
44—Hopper
45—Internal insulation of casing
46—Propellant slurry
47—Gaskets
48—Gaskets
49—Fin decoring tool
50—Long arm of the fin decoring tool
51—Counter-mass in the fin decoring tool
52—Eye-bolt
53—Additional bolts for fin decoring tool
54—Cured propellant grain
55—Longitudinal axial cavity
56—Section of central port having reduced diameter
57—Section of central port having increased diameter
58—Counter-bore of cured propellant grain
59—Forward-swept leading edge of fin
60—Deep cavities of fin
61—Minimum thickness of fin web The foregoing detailed description has described only a few of the many possible implementations of the present invention. While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A mandrel assembly for manufacturing a solid propellant grain of a rocket motor, said mandrel assembly comprising:
   a base mandrel removably connectable to aft-end opening of rocket motor casing and capable of forming an aft-end counter bore in the propellant grain of the rocket motor;
   a core mandrel removably connectable to the base mandrel, wherein the core mandrel is capable of forming a longitudinal axial cavity in the propellant grain; and
   a plurality of fin molds, removably connectable to the base mandrel, wherein the plurality of fin molds comprises a forward-swept leading edge and a forward-swept trailing edge with respect to a motor axis of the solid propellant grain to form a plurality of forward-swept longitudinal hollow fins circular-patterned about the axial cavity in the solid propellant grain of the rocket motor.

2. The mandrel assembly as claimed in claim 1, wherein the base mandrel is a hollow axisymmetric structure configured with a port portion comprising a plurality of guides disposed in a circular pattern on outer circumference of the base mandrel.

3. The mandrel assembly as claimed in claim 1, wherein the plurality of fin molds comprises a plurality of slots configured to engage with a plurality of guides for radially anchoring the plurality of fin molds onto the base mandrel.

4. The mandrel assembly as claimed in claim 1, wherein the plurality of fin molds is fastened onto the base mandrel through one or more fasteners that are accessible from within the base mandrel.

5. The mandrel assembly as claimed in claim 1, wherein the plurality of fin molds and the base mandrel have planar surfaces in the transverse plane for hermitical sealing between them with gaskets.

6. The mandrel assembly as claimed in claim 1, wherein the base mandrel is provided with a base mandrel flange for attaching the base mandrel with the aft-end opening of the rocket motor casing.

7. The mandrel assembly as claimed in claim 1, wherein the base mandrel is provided with a plurality of tapped holes disposed adjacent to the plurality of guides on the planar surface for hermitically sealing the plurality of fin molds with the base mandrel.

8. The mandrel assembly as claimed in claim 1, wherein the base mandrel is provided with an annular seal disposed on the rim at the front end of the base mandrel for enabling sealing between the base mandrel and the core mandrel.

9. The mandrel assembly as claimed in claim 8, wherein the annular seal bends and conforms to outer surface of the core mandrel for providing a sealing between the core mandrel and the base mandrel when the core mandrel is inserted into the base mandrel.

10. The mandrel assembly as claimed in claim 1, wherein the core mandrel is provided with shaft seal gaskets for hermitical sealing with port portion of the base mandrel.

11. The mandrel assembly as claimed in claim 1, wherein the base mandrel includes a counter-bore portion comprising one or more tapped blind holes on the base mandrel flange for fastening the core mandrel with the base mandrel.

12. The mandrel assembly as claimed in claim 1, wherein the plurality of fin molds is provided with rounded outer edges based on the thickness of the fin molds and configured with a contoured inner surface which conforms to the mating outer portion of the base mandrel.

13. The mandrel assembly as claimed in claim 1, wherein the leading edge and the trailing edge of the plurality of fin molds makes a predetermined acute angle with axis of the rocket motor such that the difference in acute angles of the leading edge and the trailing edge, in that order, is greater than zero.

14. A method of manufacturing a solid propellant grain of a rocket motor using the mandrel assembly as claimed in claim 1, the method comprising acts of:
   configuring the mandrel assembly into a casing of the rocket motor comprising:
      providing the plurality of fin molds inside the casing of the rocket motor;
      assembling the base mandrel to the aft-end opening of the casing of the rocket motor;
      connecting the plurality of fin molds to the base mandrel, wherein the plurality of fin molds comprises the forward-swept leading edge and the forward-swept trailing edge with respect to the motor axis of the solid propellant grain to form the plurality of forward-swept longitudinal hollow fin molds circular patterned about the motor axis in the solid propellant grain of the rocket motor;
      connecting the core mandrel to the base mandrel by inserting into the base mandrel;
   casting a propellant slurry inside the casing with assembled mandrel through a hopper on the fore-end opening; and
   decoring the mandrel assembly in sequence from the rocket motor upon curing.

15. The method as claimed in claim 14, wherein decoring the mandrel assembly comprises decoring, in the order of, the core mandrel, the base mandrel and the plurality of fin molds from the cast propellant grain with one fin mold at a time.

16. The method as claimed in claim 14, wherein the plurality of fin molds are removed from the cast solid propellant grain using a mass balanced fin decoring tool to ensure center of gravity of an assembly of the plurality of the fin molds and the mass balanced tool lies directly below lifting point.

17. The method as claimed in claim 14, wherein upon connecting the plurality of fin molds to the base mandrel, the method comprising the step of filleting all included-sharp-corner interfaces between base mandrel and the plurality of fin molds with a suitable inert material.

18. A solid propellant grain of a rocket motor manufactured using the mandrel assembly as claimed in claim 1.

19. The mandrel assembly as claimed in claim 6, wherein the base mandrel includes a counter-bore portion comprising one or more tapped blind holes on the base mandrel flange for fastening the core mandrel with the base mandrel.

* * * * *